3,355,181
SEALING STRUCTURES EMBODYING CLOSED CELL ELASTOMERIC MATERIAL

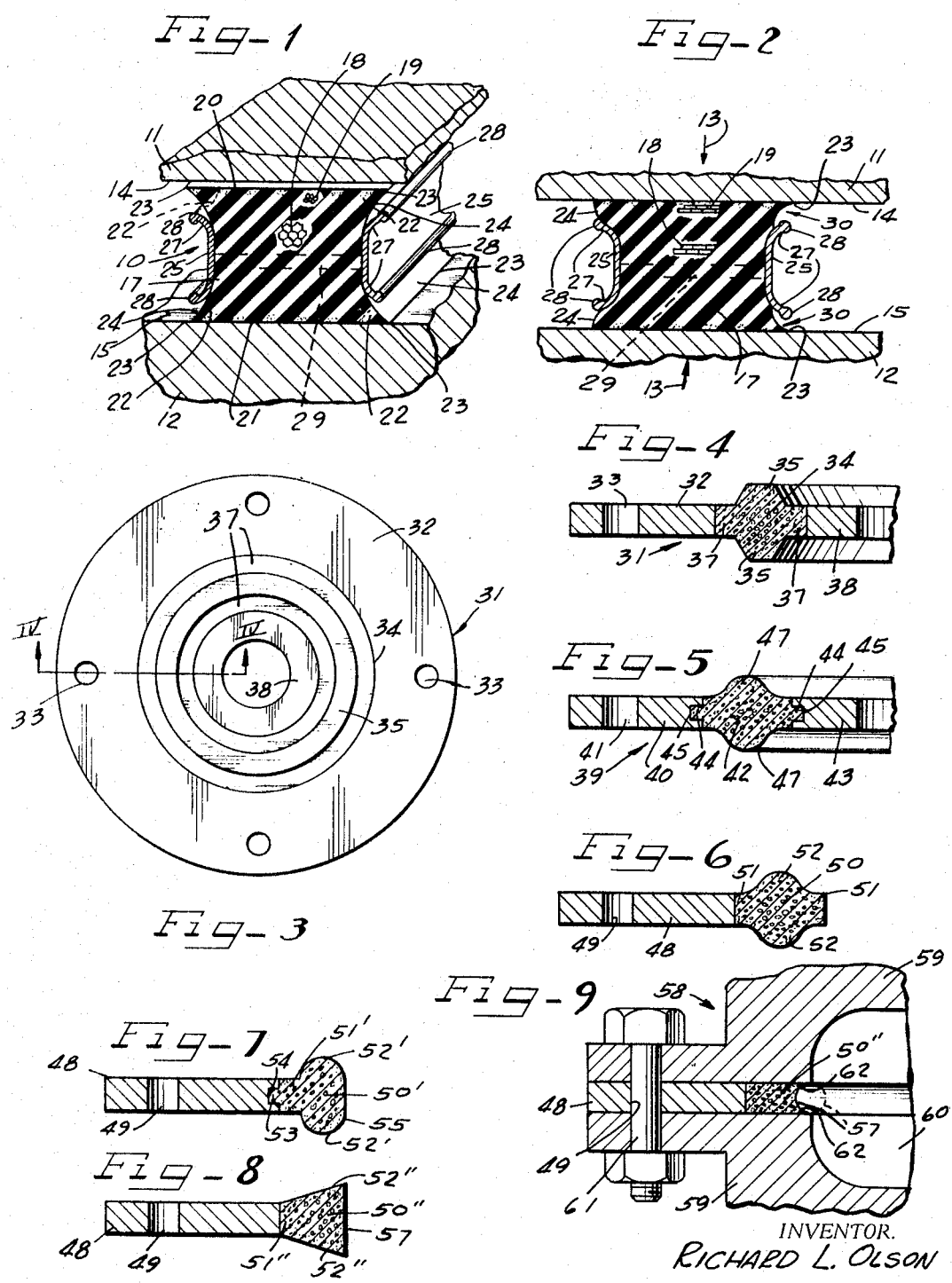

Richard L. Olson, Hickory Hills, Ill., assignor to Dike-O-Seal, Incorporated, Chicago, Ill., a corporation of Illinois
Filed Nov. 18, 1964, Ser. No. 411,980
4 Claims. (Cl. 277—180)

This application is a continuation-in-part of my application Ser. No. 123,917 filed May 26, 1961, now Patent No. 3,166,332, issued Jan. 19, 1965.

The present invention relates to improvements in sealing structures embodying closed cell elastomeric material, and more particularly concerns two sided seal, gasket or packing members or structures.

Heretofore it has been common to utilize resilient but non-compressible sealing devices such as O-rings and other types of rubber sealing gaskets or strips interposed between the parting faces of assemblies subject to differential internal and external pressures liable to leak through the joint or parting face of the assembly. However, where the pressure differential is of substantial magnitude either continuously or by way of surges of pressure, and especially where abrasive substance is entertained in air or other gas liable to leak or blow through the joint, problems of leakage, and in the case of abrasive materials, erosion, are encountered.

Further, in many instances in order to retain high pressures, utilizing incompressible resilient types of seals, excessive compression forces are necessary or have been used in an attempt to assure freedom from leakage by sheer compressive force on the seal.

Another difficulty encountered with incompressible types of resilient seals is that unless they are molded to almost impractically close tolerances adequate flow space must be afforded to receive the bulk displaced material of the seal. The molding of such seals presents intricate problems of machining templates and molds, is costly and most generally large scrap losses are encountered in molding.

It is accordingly an important object of the present invention to provide new and improved seal structures for the parting faces of apparatus (including ducts, piping, industrial equipment machines, etc.) subject to substantial differential internal and external pressures, and more particularly to provide such sealing structures that will overcome and obviate the various difficulties outlined hereinabove, as well as to afford advantages and to avoid difficulties that may not have been mentioned.

Another object of the invention is to provide a new and improved parting face seal, gasket and the like structure which is readily predeterminable with respect to desirable compression factors to meet the requirements of various operating pressure conditions.

A further object of the invention is to provide new and improved sealing, gasket and like structures in which sealing is effected by elastomeric material having gas filled small, discrete separated individual bubbles so as to be bulk compressibly deformable with the ability to conform intimately with opposing parting faces to be sealed and requiring no displacement space or provision since the seal material is fully compressibly displaceable into itself under compression.

Still another object of the invention resides in the provision of a new and improved sealing device including a strip-like seal member of closed cell elastomeric material which is flexibly deformable as well as resiliently compressible arranged to be placed under compression by a surface to be sealed against passage of fluid pressure and wherein the seal member provides a sealing lip edge which increases its fluid sealing engagement with the surface to be sealed not only by virtue of direct fluid pressure against the lip but also as a result of increasing internal pressure thrust due to compression of the cells within the material of the seal member.

A still further object of the invention is to provide a new and improved sealing device of the gasket type having a sealing strip of resiliently flexibly bulk compressible closed cell elastomeric material presenting directly opposite sealing projections which are engageable against opposed parting or joint-forming surfaces and whereby the opposed sealing projections mutually cooperate to increase the sealing thrust of one another by direct compression into the body of the seal member.

It is still another object of the invention to provide a new and improved bulk compressible flexibly resilient seal affording a surface exposed to pressure when the seal is compressibly confined between opposing parting or joint surfaces and whereby the exposed surface is adapted to function in diaphragm-like manner responsive to pressure surges or pulsations and without requiring any voids or spaces for displacement or flow of the material of the seal.

Other objects, features and advantages of the present invention will be readily apparent from the following detailed description of certain preferred embodiments thereof taken in conjunction with the accompanying drawing, in which:

FIGURE 1 is a fragmentary transverse sectional, isometric view of a seal structure embodying features of the invention;

FIGURE 2 is a transverse sectional view of the seal structure of FIGURE 1 but with the surfaces to be sealed moved together to engage the seal member;

FIGURE 3 is a plan view of a gasket type seal structure embodying features of the invention;

FIGURE 4 is an enlarged fragmentary sectional detail view taken substantially on the line IV—IV of FIGURE 3;

FIGURE 5 is a sectional view similar to FIGURE 4 but showing a modification;

FIGURE 6 is a fragmentary sectional detail view of a further modification;

FIGURE 7 is a sectional detail view showing still another modification;

FIGURE 8 is a sectional detail view showing yet a further modification; and

FIGURE 9 is a fragmentary sectional detail view showing a sealed assembly embodying a sealing structure of the type exemplified in FIGURES 6–8.

As exemplified in FIGURES 1 and 2, a two-sided seal, gasket or packing structure 10 is constructed and arranged to be operative between opposed members 11 and 12 which are relatively movable toward one another, as indicated by directional arrows 13 in FIGURE 2, either intermittently or for a more or less continuous secured relationship, depending upon the operation of the apparatus, equipment or structure of whatever nature the members 11 and 12 may comprise components. Whatever their operational function, the members 11 and 12 provide respective opposed parting faces 14 and 15 between which fluid pressure passage must be blocked in at least one direction, and possibly pressure differentials may have to be controlled in respective opposite directions through the joint or space between the parting faces.

As the principal component of the seal structure 10, a sealing strip body 17 is provided comprising a bulk compressible, multi-closed cell elastomeric material having substantially separate, independently acting, small, generally bubble-like gas cells having flexible interconnected walls of the elastomeric material. Any suitable manufacturing method may be utilized in forming the body 17, such as molding or extruding and any suitable elastomeric material may be utilized selected from natural or synthetic rubbers or plastics. In my Patent 2,815,549 certain desirable formulations including buna-N, buna-S and neoprene are exemplified. Resilient types of polyurethane, silicone, and the like, are also useable where desired. Whatever the material in the body 17 sponge rubber characteristics inherent in the finished product afford bulk compressibility (the ability to compress into the mass itself) as distinguished from bulk deformability (displacement by flowing and devoid of any practical bulk compressibility). By predetermined variation in the ratio of cell wall material to bubbles in the mass of a wide range of compression factors may be had, that is, stiffness and resistance to bulk compression. Several sizes of bubbles may be used. As shown, larger or more readily compressible but weaker bubbles 18 may be in the central region of the body 17 while smaller and stronger such bubbles 19 may be located closer to the outer surfaces of the body. However, this relationship of larger to smaller bubbles or bubble areas may be reversed, if desirable.

In this instance, the sealing body or member 17 has opposite sealing faces 20 and 21, shown as generally planar. Along each longitudinal edge of the respective surfaces 20 and 21 is provided a reentrant lip edge region defining a sharp or acute angle corner or lip edge 23 at the outer extremity. In divergent relation to the respective sealing surfaces 20 and 21, each of the regions 22 has a side wall portion 24 which, in the uncompressed condition of the seal member, slopes sharply inwardly.

At its sides intermediate the respective surfaces 20 and 21, and between the sloping side wall portions 24, the seal body 17 is confined by a rigid structure provided by any suitable means but herein exemplified as comprising two spaced apart and elongated flanges or strips 25 which may be substantially identical and comprise extruded or rolled or otherwise formed shapes of suitable metal or other material. Each of the flange members 25 is of a generally channel shape having respective outwardly curved longitudinal opposite marginal portions 27 each terminating in a rolled over or thickened edge portion 28 for strengthening reinforcement and stiffness. These confining flange plate members 25 are desirably interconnected in predetermined spaced relation by suitable securing means such as rods or spacers 29. As thus constructed, the confining structure provides opposed fixed confining surfaces afforded by the rigid members 25 merging into the progressively increasingly curved outturned marginal portions 27 which diverge from but oppose substantial adjacent areas of the wall portions 24 of the seal member.

For a two-way acting sealing relationship, the sealing face portions of the seal member 17, including at least the major portions of the lip edge regions 22 project substantially beyond respective planes across the edges 28 of the confining members 25 where to afford a substantial range of bulk compression of the seal member between the opposed members 11 and 12. In FIGURE 1, the members 11 and 12 are shown as spaced apart in nonsealed relation, wherein the parting face 14 is spaced from the seal surface 20. In FIGURE 2, the members 11 and 12 are shown in closed or seal-compressing relation wherein the seal member 17 is compressed therebetween with the projecting portions of the seal member sealingly engaged. Although the seal structure 10 may be so to speak floatingly interposed between the members 11 and 12, one of the seal surfaces may be secured to one of the members, such, for example as the seal surface 21 may be secured as by bonding it to the parting face 15.

As shown at the left side of FIGURE 2, under compression between the members 11 and 12, the side wall portions 24 back against the opposed outturned marginal portions 27 of the confining members 25, with the areas of the side wall portions 24 which remain unconfined bulging outwardly slightly by virtue of internal compression forces in the adjacent parts of the compressible seal body. This is advantageous since it enables a generally diaphragm-like inward compression movement of the lip edge regions 24 under fluid pulsations or surges having at least some shock absorbing function. Further, as these slightly outwardly bulged side wall portions 24 are pressed inwardly they curved oppositely under the sealed fluid pressure indicated by the arrows 30 at the right side of FIGURE 2 which increases the sharpness of the dihedral angle of the sealing lip and enhances the sealing action by pressing of the sealing lip against the opposed parting face as a result of the fluid pressure. Force of the inward compression against the side wall portions 24 fades out toward the opposite side of the seal member by virtue of the progressive resistance to compression of the multitude of small bubbles 19 within the seal member, and which bubbles are already compressed as a result of the compression afforded by the compressing members 11 and 12. There is thus no problem of blow-out or migration of the seal member 17 under fluid pressure within the limits of a substantial range of pressures for which the particular seal assembly is calculated in respect to the work to be performed.

It will be understood, of course, that the maximum approach of the members 11 and 12 while compressing the seal member 17 will be determined to avoid pinching off of the bulged sealing corner portions between the confining member edges 28 and the parting faces of the sealed members.

It will be understood that the sealing structure of FIGURES 1 and 2 may be embodied in various types of gaskets, packings and like structures and seals in elongated or strip form and may be conformed to fit with flat, rounded, rotary, slidable or otherwise relatively movable surfaces to be sealed. A particular use for a two-way acting gasket or seal such as the structure 10 is to hold two-way acting pressure differences, as in the doors and other openings of pressurized airplanes, and the like.

In FIGURES 3 and 4 is shown an embodiment of the invention in which a seal structure 31 is in the form of a gasket comprising a disk 32 which may be provided with bolt holes 33 and which carries a seal body 34. Although the disk 32 may be made of suitable metal, it may also comprise a rigid or semi-rigid plastic, hard or semi-hard rubber, and the like.

Since the seal structure 31 is adapted for uses wherein the disk 32 is firmly clamped in face-to-face engagement between parting faces of an assembly such as a pipe, duct pressure or vacuum chest joint, or the like, the multi-closed cell seal body 34 is constructed and arranged to afford sealing projections or ribs 35 which project substantially beyond the respective opposite faces of the disk 32. These rib portions 35 are compressibly displaceable entirely into the initial volume of the main portion of the body by the elastic volume reduction of the gas cells of the material of the seal member. By predetermining the size and ratio of gas-filled bubbles or cells to elastomeric material in the seal member 34, the compression ratio or resistance to compression can be readily calculated for particular uses. In order to avoid pinching of the material of the projection ribs 35 under compression, the ribs 35 are formed taper-sided toward relatively narrower crowns than the base or root portions of the ribs, and the body of the seal member is desirably provided with a narrow flange 37 by which it is connected to the disk 32 and desirably of at least the same thickness. A directly bonded relation of the body flange 37 to the contiguous edge of the disk 32 may be effected so that the seal 34 is carried as a permanent part of the disk.

In order to afford confinement at each side of the body of the seal member 34, a second disk or ring 38 is mounted on the opposite side of the body of the ring, as by molding the seal body directly to the member 38. Where the disk 32 comprises a ring having a substantial inner diameter to which the seal member 34, also of ring shape, is attached, the member 38 may comprise a narrow confining ring, substantially as shown. It will be appreciated, of course, that if strip seal is desired, the members 32 and 38 may be elongated strips or flanges with the seal 34 confined at its sides therebetween.

In use, the ridges or ribs 35 are bulk compressed and displaced into the body of the seal 34 and effectively seal the joint between the opposed compressing parting faces of the associated assembly. In the compressed, sealing condition, the sides of the rib projections 35 on the high pressure side of the seal are responsive to yield at least to some extent under pressure surges with development of sealing lip on the order of the reaction described in connection with FIGURES 1 and 2, although due to the greater compression of the seal between the opposed members to be sealed, this action may not be as pronounced as in the form of FIGURES 1 and 2 wherein a lip is preformed on the seal.

In the embodiment of FIGURE 5, a gasket-type sealing structure 39 is provided similar to the gasket-type structure 31 of FIGURE 4. A disk 40 may have bolt holes 41. A gas bubble elastomeric seal 42 is confined between the disk 40 on one edge of which it is mounted and an opposing edge of a confining ring member 43. In this instance the seal 42 has interlocked tongues 44 on its edges for increasing the area of engagement with the edges of the members 40 and 43 which are provided with complementary retaining grooves 45 in which the tongues 44 are received.

In order to withstand conditions of flexure and the like which might tend to disrupt the exposed surface of the seal member 42, it is provided with oppositely facing compressible sealing rib projections 47 having the surface thereof of a transversely curvate form and merging with an opposite curve with the sides of the body portion, affording a generally ogee curvature from the crown of each of the ribs toward each side.

In FIGURES 6, 7 and 8, embodiments of the invention are disclosed in which a disk or strip 48, which may be provided with suitable bolt holes 49 carries at one edge a seal strip body 50, 50' or 50'', as may be preferred. Such seal strip is of the same type as described in respect to the other embodiments herein, namely of a suitable elastomeric material having substantially separate, independently acting, small, generally bubble-like gas cells with flexible inter-connecting walls of the elastomeric material, which is bulk compressible, to afford the advantages, among others, described. Desirably, the seal strip is bonded to the edge of the associated gasket strip, plate or disk along one edge of the strip. In this embodiment if the invention, the opposite edge of the strip is free.

In the embodiment of FIGURE 6, the sealing strip 50 has opposite marginal edge portions 51 which are of about the same thickness as the carrying member 48. Intermediately, the sealing strip 50 has oppositely projecting sealing rib ridges 52 projecting substantially beyond the opposite face planes of the member 48.

In the embodiment of FIGURE 7, the sealing strip 50' has only one marginal edge flange portion 51' by which it is attached to the supporting member 48 and for increased attachment surface and interlock is provided with an edge tongue 53 received in a corresponding edge groove 54 in the member 48. In this form, opposite transversely curvate sealing rib projections 52' are provided merging at the side of the body of the seal 50' opposite to the body flange 51' in a, in this instance, flat face 55.

A generally keystone-like transverse cross-sectional shape is afforded for the sealing strip 50'' of FIGURE 8. At its edge which is attached to the associated gasket member 48, the sealing strip 50'' has an edge portion 51'' which is of a width substantially the same as the gasket member. From this edge, the seal 50'' progressively diverges in thickness to afford opposite rib projections 52'' having their peaks aligned along an edge face 57 which, in this instance, is rectilinear between the crests.

It will be appreciated, of course, that with respect to any of the embodiments of FIGURES 6, 7 and 8, various permutations of the shapes depicted in the compressible seal ridges may be effected as preferred, and other modifications will readily suggest themselves to meet special circumstances. While having oppositely projecting compressible ribs which compress toward one another into the body of the seal, takes maximum advantage of the desired compression factor to be incorporated in any given seal, only a single such compressible rib projection may be adapted for certain purposes. In any event, this type of gasket-like seal is especially suitable for direct edge impingement of pressure to be sealed against the seal in a joint wherein the gasket member 48 serves as a gauge upon the extent of compression of the associated seal strip between compressibly confining parting faces clamped onto the gasket member.

By way of example, in FIGURE 9 is depicted, a cavitated assembly 58 comprising a pair of flanged complementary cavitated members 59 defining therebetween a cavity 60 and between which the gasket member 48 is clamped and the assembly maintained by means of bolts 61 extending through the bolt holes 49. In this instance, the gasket embodying the bulk compressible sealing strip 50'' has been chosen for illustrative purposes to afford a seal between the parting faces of the members 59.

As clamped in the assembly, the ridge or rib projections of the sealing strip are compressibly displaced by the parting faces of the members 59 into the initial volume of the main portion of the sealing strip by the elastic volume reduction of the gas cells in the main portion. Since the engaged edge of the gasket member 48 provides a confining wall displacement in that direction of the material of the sealing strip is precluded. Thus the sealing strip is compressibly confined on three sides and free only on the side or edge thereof which is exposed to pressure within the chamber of the cavity 60.

Initially the unconfined edge face of the sealing strip will bulge at least slightly in the unconfined direction between the parting faces of the members 59. This bulging is not a flow or bulk displacement of the seal material, but is caused by the resistance to compression of gas cells within the seal body adjacent to the unconfined edge tending to escape the compressive force applied to the seal mass by compression displacement of the initially projecting ribs thereof into the body of the mass. Inwardly from the unconfined edge the gas cells or bubbles are progressively stiffer under the compression pressure of the confining surfaces. In FIGURE 9 the initial tendency toward bulging of the unconfined edge surface 57 is depicted in dash outline.

As pressure within the cavity 60 develops to a magnitude greater than the pressure of the already at least partially compressed gas within the cells of the seal member adjacent to the edge surface 57, such gas cells are compressed to displace the bulged material of the seal inwardly and thus increase the pressure with which the sealing faces of the seal member thrust sealingly against the parting faces of the members 59. Under at least maximum pressure thrust from within the cavity 60, the bulged face 57 is reversibly cavitated as shown in full line in FIGURE 9 with the result that definite dihedral angle sealing lips 62 are formed which most effectively sealingly engage the parting faces of the members 59 and preclude escape of fluid past the seal. This diaphram-like action of the exposed face of the compressible sealing member is highly advantageous especially under conditions of pulsating and pressure surge conditions.

Where there is material entrained in the pressure fluid against which the joint is sealed and which material might tend to deposit on or cake in or about the joint, the arrangement whereby the initially compressively bulged exposed face of the seal projects from the joint into the cavity 60 is advantageous as a self-cleaning feature. As the chamber 60 depressurizes or at least pressure surges die out, the diaphragm action of the compressible free or exposed surface 57 of the seal dislodges any material that might tend to collect thereon and thrusts it back into the cavity, or stream of fluid flowing thereby where the cavity is within a duct or conduit system.

In all forms of the invention, as the one or more projections is increasingly deformed and bulk compressed into the confined body part of the main portion or body of the seal mass by the gas compression in the individual, unconnected cells or bubbles, increasing percentages of all of the fluid filled cells are at about the same pressures. However, these transmitted pressures progressively reduce in approaching an unconfined boundary surface, since each bubble wall has its own elastic stiffness or resistance to deformation. Moreover, there is a strong resistance to blowing out or bursting under high pressures of the confined gas in the bubbles. For a given or desired percentage of confined gas relative to the total volume, this progressive reduction in transmitted pressures and bursting forces is greater for smaller diameter or smaller volume bubbles and increases rapidly as they become smaller down to practical limits. For example, particularly for high strength materials and for high percentages of confined gas in the bubbles, the upper limit for the diameters of the effective preponderances of the bubbles may be on the order of about 0.02 to 0.03 inch thereby to benefit by the rapidly increasing resistance to bursting and improved flexural strength, as is desirable. The lower such limit, particularly for low percentages of confined gas, is a practical one, depending on the ability to form interbubble walls of correspondingly reduced thickness with particular materials and by particular expanding, blowing, or other bubble forming techniques and may be about 0.001 inch diameter or somewhat less for strong materials and relatively thick walls. Generally, it is simpler to form the bubbles more or less uniformly throughout the mass, except at the progressive transition or boundary region, as it merges into a skin on the exposed surface of the seal, where such a skin is (most generally) provided. The particular ranges or values for bubble sizes need not apply to each and every closed cell since a small percentage, such as ten percent or fifteen percent or more, may be undesirably too large or too small without especially adverse effects so long as the effective preponderances of the bubbles are in the preferred range of sizes, particularly in the more critical regions effectively close to an unconfined surface. Nitrogen filled bubbles are desirable.

An advantage of the at least partial confinement of the body mass of the seal strip resides in that as the confinement increases progressively in a related or matched fashion to the compressing or engaging loads as the projecting portion or portions is or are compressed or displaced into the initially confined portion of the body of the mass, there is a high ability of the gas filled cells or bubbles to withstand very high pressures without bursting of the cells or outer skin of the seal, since the bubbles or cells are increasingly confined and restrained against bursting as the pressures increase. Further, as the volume of the mass is progressively reduced there is a resultant rapid increase in the compression factor or spring rate and thus sealing thrust against the engaged surface or surfaces to be sealed.

It will be understood that modifications and variations may be effected without departing from the scope of the novel concepts of the present invention.

I claim as my invention:

1. A pressure assembly comprising:
   a pair of separable substantially rigid members with flat planar confronting parting faces providing a parting joint to be substantially sealed against fluid pressure therethrough in at least one direction;
   said members having between and engaging the parting faces a stationary seal against pressure fluid escape thereby comprising a strip of elastomeric material having substantially separate, independently acting, small, generally bubble-like gas cells having flexible interconnecting walls of the elastomeric material;
   said strip having oppositely facing sealing surfaces which are respectively engaged sealingly against said parting faces;
   and a confining blow-out preventing member rigid relative to and secured to the strip on the side thereof which is opposite to the side toward which said fluid pressure is directed and having surfaces which oppose said parting faces and beyond at least one of which rigid member surfaces a substantial portion of the strip having thereon one of said sealing surfaces normally projects substantially;
   said parting faces being engaged under pressure toward one another and against said strip;
   said projecting portion being bulk compressibly displaced by the pressure engagement of said parting faces against the strip into the initial volume of the main portion of the strip by elastic volume reduction of the gas cells in the strip and as confined between said parting faces and said confining member;
   and said strip having on said side toward which the fluid pressure is directed an unconfined wall face portion which under said pressure engagement normally bulges outwardly by virtue of internal compression forces in the strip and which wall face portion is displaced inwardly by compression of the material and curves oppositely to the bulge under sealed fluid pressure whereby a diehedral angle sealing lip is exposed to the fluid pressure and is pressed thereby against the adjacent parting face.

2. A pressure assembly comprising:
   a pair of separable substantially rigid members with confronting parting faces providing a parting joint to be substantially sealed against fluid pressure therethrough in at least one direction;
   said members having between and engaging the parting faces a seal against pressure fluid escape thereby comprising a strip of elastomeric material having substantially separate, independently acting, small, generally bubble-like gas cells having flexible interconnecting walls of the elastomeric material;
   said strip having oppositely facing sealing surfaces which are respectively engaged sealingly against said parting faces;
   and a confining blow-out preventing member rigid relative to the strip on the side thereof which is opposite to the side toward which said fluid pressure is directed and beyond which a substantial portion of the strip having thereon one of said sealing surfaces normally projects substantially;
   said projecting portion being bulk compressibly displaced by the opposed pressure engagement of said parting faces against the strip into the initial volume of the main portion of the strip by elastic volume reduction of the gas cells in the strip and as confined between said parting faces and said confining member;
   said strip having on said side toward which the fluid pressure is directed an unconfined wall face portion which under said pressure engagement normally bulges outwardly by virtue of internal compression forces in the strip and which wall face portion is displaced inwardly by compression of the material and curves oppositely to the bulge under sealed fluid pressure whereby a dihedral angle sealing lip is exposed to the fluid pressure and is pressed thereby against the adjacent parting face;
   and a second rigid confining member on said side of the strip toward which the fluid pressure is directed, but of a width less than such side so as to expose a substantial portion of such side continuously to the pressure fluid.

3. A pressure assembly as defined in claim 2, in which said second confining member is of substantially narrower width and disposed intermediately on said side toward which the fluid pressure is directed whereby to expose substantial areas of such side along each side of said confining member continuously to the pressure fluid.

4. A pressure assembly as defined in claim 2, in which the exposed portion of the side of the strip toward which the pressure fluid is directed has a substantially lip seal configuration before the strip is compressed, and said second rigid member has a marginal edge portion which diverges relative to said lip seal configuration and toward which the exposed portion of the lip seal configuration side of the strip thrusts in the bulged condition thereof and relative to which the lip seal configuration cavitates when subjected to the pressure fluid.

References Cited

UNITED STATES PATENTS

| | | | |
|---|---|---|---|
| 2,121,826 | 6/1938 | Roberts | 49—498 |
| 2,717,793 | 9/1955 | Nenzell | 277—180 |
| 2,997,755 | 8/1961 | Olson. | |
| 3,170,701 | 2/1965 | Hoover | 277—180 |
| 2,914,369 | 11/1959 | Hayman. | |
| 3,029,480 | 4/1962 | Signorelli et al. | 277—227 X |

FOREIGN PATENTS 701,614  12/1953  Great Britain.

SAMUEL ROTHBERG, *Primary Examiner.*